Oct. 14, 1958

R. B. NEUBERGER 2,856,059

MECHANISM FOR FEEDING AND SEPARATING ARTICLES
IN CONTIGUOUS RELATION

Filed April 14, 1955

INVENTOR.
ROGER B. NEUBERGER
BY
ATTORNEYS

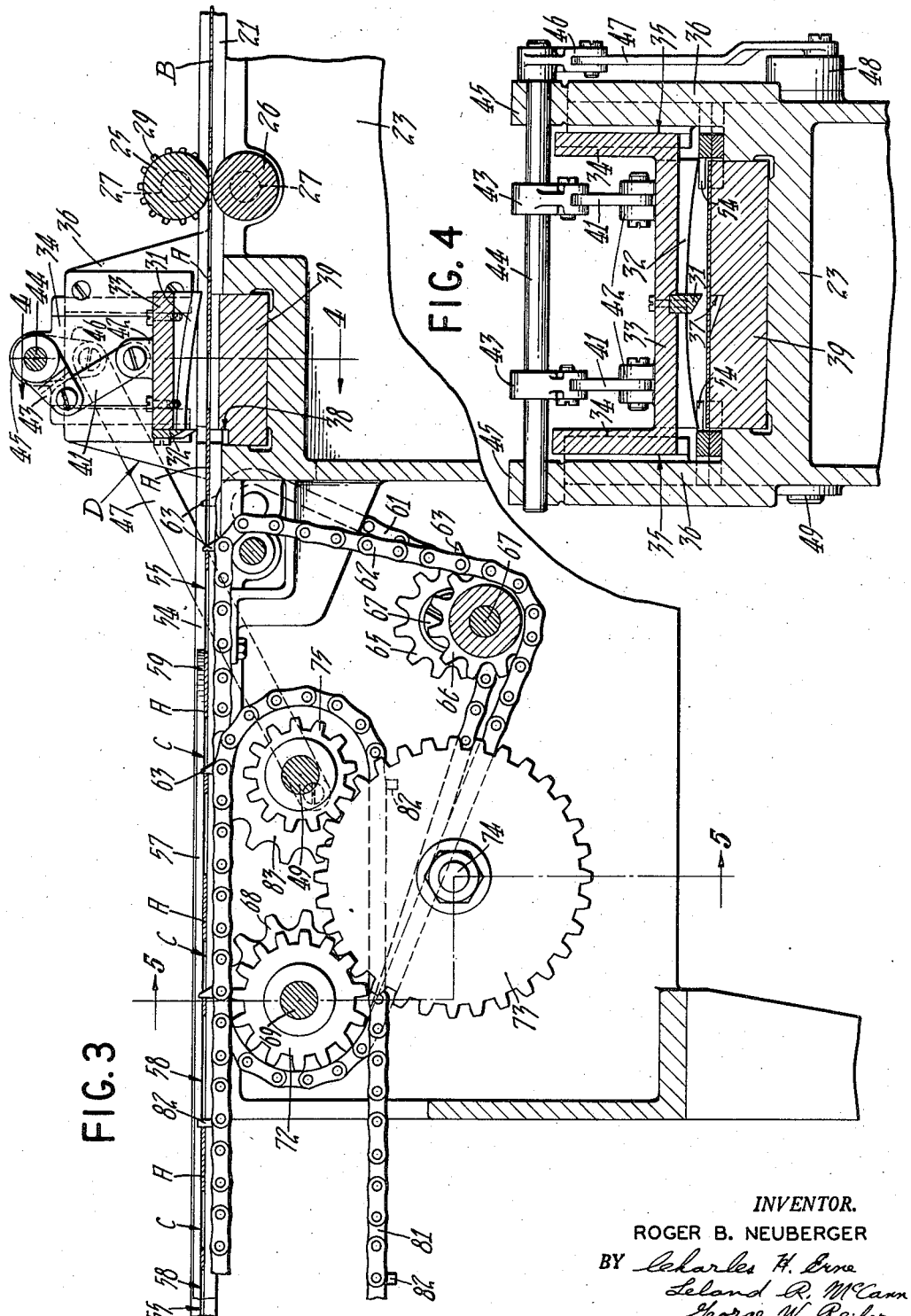

Oct. 14, 1958 R. B. NEUBERGER 2,856,059
MECHANISM FOR FEEDING AND SEPARATING ARTICLES
IN CONTIGUOUS RELATION

Filed April 14, 1955 6 Sheets-Sheet 3

INVENTOR.
ROGER B. NEUBERGER
BY
ATTORNEYS

Oct. 14, 1958   R. B. NEUBERGER   2,856,059
MECHANISM FOR FEEDING AND SEPARATING ARTICLES
IN CONTIGUOUS RELATION
Filed April 14, 1955   6 Sheets-Sheet 4

*INVENTOR.*
ROGER B. NEUBERGER
BY Charles H. Erne
Leland R. McCann
George W. Reiber
ATTORNEYS INVENTOR.
ROGER B. NEUBERGER
BY Charles H. Erne
Leland R. McCann
George W. Reiber
ATTORNEYS Oct. 14, 1958　　　R. B. NEUBERGER　　　2,856,059
MECHANISM FOR FEEDING AND SEPARATING ARTICLES
IN CONTIGUOUS RELATION
Filed April 14, 1955　　　　　　　　　　6 Sheets-Sheet 6
FIG.11
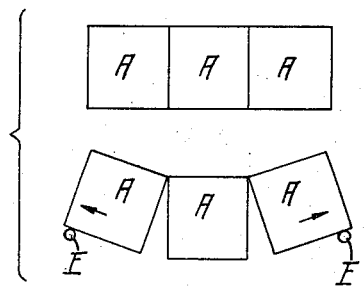
FIG.13
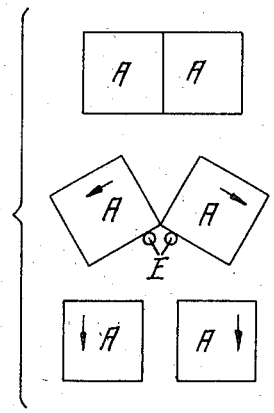
FIG.14
FIG.12
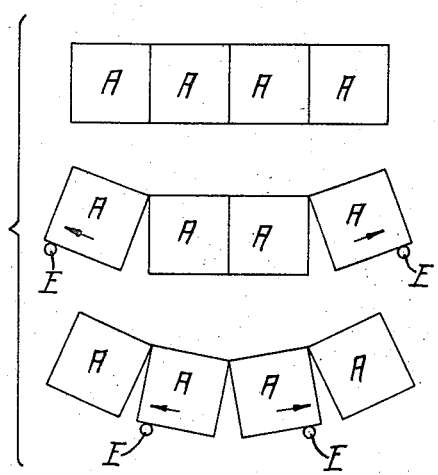
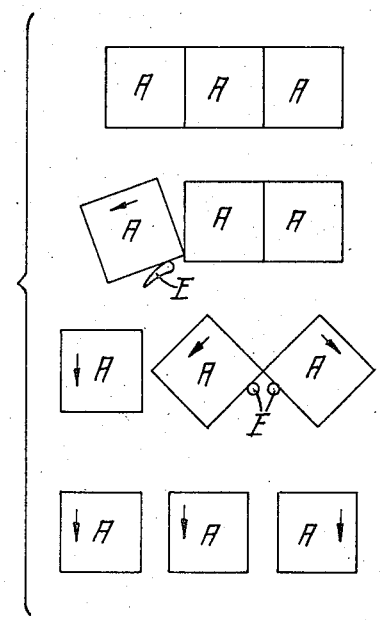
INVENTOR.
ROGER B. NEUBERGER
BY *Charles H. Erne*
*Leland R. McCann*
*George W. Reiber*
ATTORNEYS United States Patent Office 2,856,059
Patented Oct. 14, 1958

2,856,059

MECHANISM FOR FEEDING AND SEPARATING ARTICLES IN CONTIGUOUS RELATION

Roger B. Neuberger, San Mateo, Calif., assignor to American Can Company, New York, N. Y., a corporation of New Jersey Application April 14, 1955, Serial No. 501,402

7 Claims. (Cl. 198—34)

The present invention relates to a mechanism for feeding and separating articles in contiguous relation and has particular reference to devices for applying frictional force to moving contiguous articles to pivot them into separated relation for advancement along separate paths of travel.

An object of the instant invention is the provision of a mechanism for feeding and separating articles in contiguous relation, such as containers or container parts which are received in batches or rows in which the articles are disposed so closely adjacent each other in side-by-side relation that separation is required to effect further advancement along separate paths of travel individually for a subsequent treatment.

Another object is the provision of such a mechanism which readily separates and directs into separate paths of travel flat articles received directly from a web or sheet of material from which the articles are produced by a slitting operation which leaves them in a contiguous relation.

Another object is the provision of such a mechanism wherein frictional forces applied to surfaces of the contiguous articles are utilized to turn or pivot the articles relative to each other to separate their contiguous faces or edges to facilitate direction of the articles individually along separate paths of travel.

Numerous other objects and advantages of the invention will be apparent as it is better understood from the following description, which, taken in connection with the accompanying drawings, discloses a preferred embodiment thereof.

Referring to the drawings:

Fig. 3 is a longitudinal section taken substantially along the line 3—3 in Fig. 1;

Figs. 4 and 5 are transverse sections taken substantially along the lines 4—4, 5—5 in Fig. 3;

Figs. 11, 12, 13 and 14 are schematic views showing modifications in the arrangement and separation of contiguous articles.

Figures 1, 2:
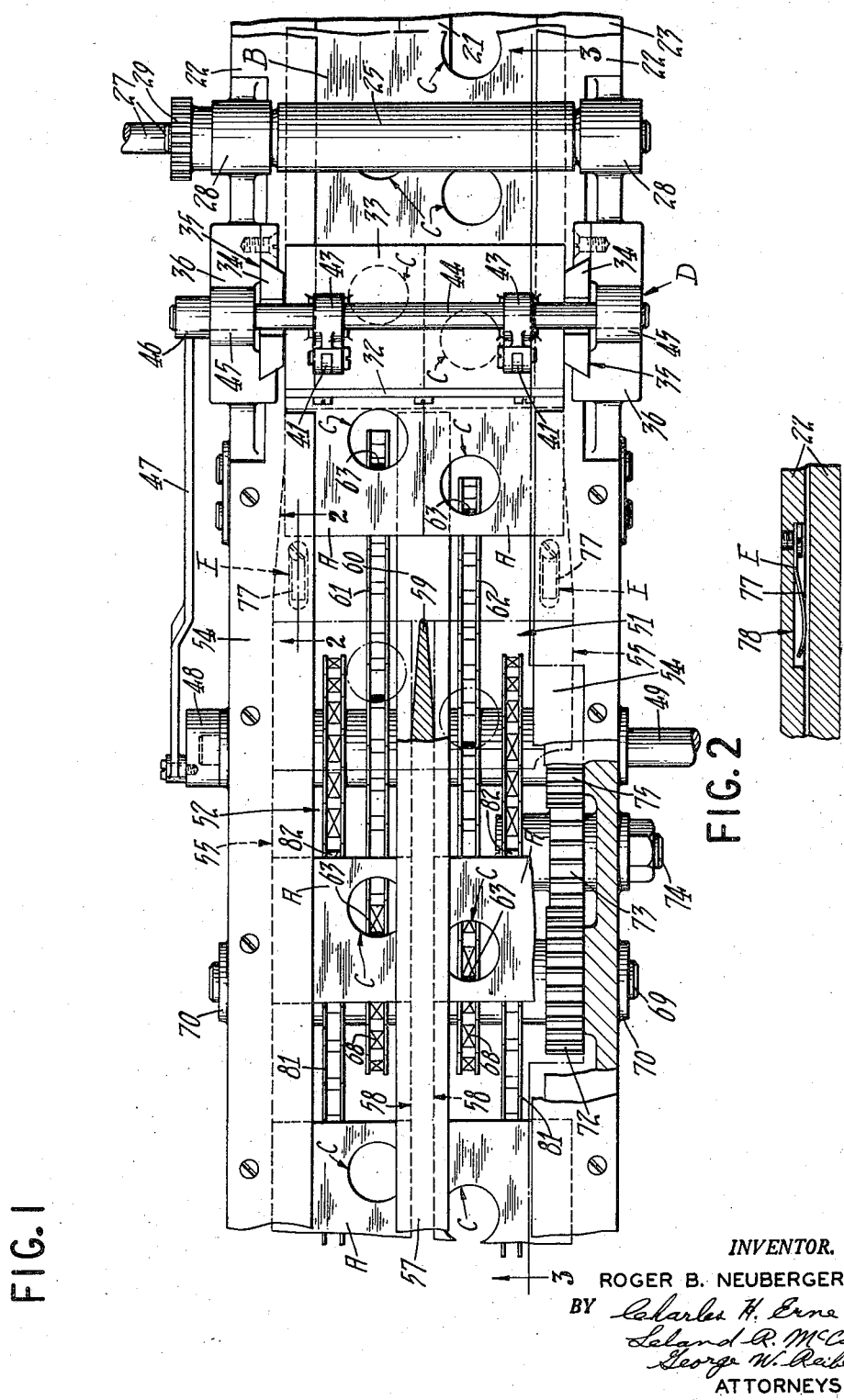
Figure 1 is a plan view of apparatus embodying the instant invention, with parts broken away.
Fig. 2 is an enlarged detailed sectional view taken substantially along the lines 2—2 in Fig. 1.

As a preferred or exemplary embodiment of the instant invention the drawings illustrate an apparatus for separating and feeding into individual runways, flat rectangular fibre container end members A cut from a substantially continuous web or strip B of fibre material, although the invention is equally well adapted to other articles such as containers or other container parts and to other suitable materials.

In a preferred form of the invention as illustrated in Figs. 1 to 8 inclusive the container end members A in one corner thereof are provided with container filling and dispensing openings C which are utilized in feeding the end members as will hereinafter be fully explained. These openings C are formed by a previous operation in the web B so that the web as supplied to the instant apparatus contains the openings in predetermined relation therein.

The web B enters the apparatus at one end thereof (at the right as viewed in Fig. 1) preferably in a horizontal position, supported on a horizontal rail 21 (Fig. 1) and with its outer marginal edge portions disposed in and guided by a pair of spaced and parallel longitudinal grooved guide rails 22 secured to the top of a frame 23 which constitutes the main frame of the apparatus. The web B is advanced into the apparatus by a pair of feed rollers 25, 26 (Figs. 1 and 3) between which the web passes. These feed rollers 25, 26 extend across the path of travel of the web and are mounted on rotatable shafts 27 which are journaled in bearings 28 formed on the frame 23 adjacent the guide rails 22. The rollers are rotated in unison and in the proper direction by a pair of meshing spur gears 29 carried on the two shafts 27. One of the shafts 27 is a drive shaft which is operated in any suitable manner to advance the web.

Figure 6:
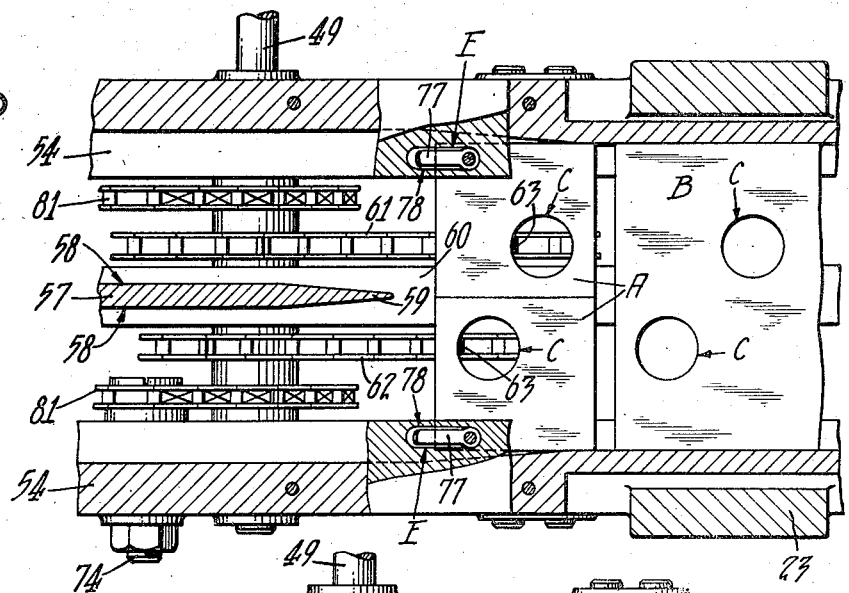
Figs. 6, 7 and 8 are fragmentary plan views similar to Fig. 1 and showing how articles moving through the apparatus are separated and directed along individual paths of travel.

The feed rollers 25, 26 advance the web B preferably into a cutting station D (Fig. 1) where the web is slit longitudinally and also cut transversely to produce at each cut two container end members A each containing one of the openings C as illustrated in Figs. 1 and 6. Since no material is removed from the web by this slitting and cutting operation, the two end members A thus produced are left in a contiguous side-by-side engagement constituting a transverse row of contiguous articles.

The slitting and cutting operations on the web preferably are effected by a longitudinal slitting knife 31 (Figs. 3 and 4) and a transverse cutter or blade 32 carried in a vertically reciprocable head 33 disposed above the path of travel of the web. The outer ends of the head 33 are formed with vertical slides 34 (see also Fig. 1) which operate in vertical slideways 35 formed in brackets 36 which extend up from the top of the frame 23 adjacent its outer edges (Fig. 4). The knife 31 and the blade 32 cooperate for the slitting and cutting operation with cutting edges 37, 38 (Figs. 4 and 3 respectively) formed in a shear block 39 carried in the frame 23 and across which the web B passes for cutting.

Reciprocation of the head 33 preferably is effected by a pair of links 41 (Figs. 3 and 4) which at their lower ends are pivotally attached to lugs 42 formed on the head. At their upper ends the links 41 are pivotally attached to a pair of spaced arms 43 mounted on a crossshaft 44 the outer ends of which are carried in bearings 45 formed in the slide brackets 36. One end of the crossshaft 44 carries a rocker arm 46 (see also Figs. 1 and 5) which is pivotally connected by a long link 47 to a crank disk 48 mounted on an outer end of a continuously rotating drive shaft 49 journaled in bearings formed in the frame 23. The drive shaft 49 is rotated in the proper direction in any suitable manner.

For each reciprocation of the head 33, the web B is advanced a distance equal to the length of one end member A. When the forward end of the web is in cutting position the two forward potential end members A extend beyond the transverse knife blade 32. Hence upon a cutting stroke, the two forward end members A are severed from the web B and simultaneously the web is slit longitudinally to define the next two following end members. Thus after a slitting and cutting operation, the two forwardmost end members A are still in a contiguous unspaced side-by-side relation, and are disposed beyond the cutting station and are still guided along their outer marginal edges by the guide rails 22. In this position they are disposed in front of but out of alignment with a pair of longitudinal, spaced and parallel, runways 51, 52 (Figs. 1 and 5) which are arranged to receive the two end members individually for further advancement to a suitable place of deposit.

The runways 51, 52 are defined along their outer edges by flared out extensions 54 (Figs. 1 and 5) of the guide rails 22, which extensions are provided with horizontal grooves 55. The grooves are continuations of the grooves in the rails 22 and provide for support of the end members A along their outer edges. The inner edges of the runways 51, 52 are defined by an inner or central guide rail 57, which preferably is common to both runways and is formed with horizontal grooves 58 in both edges thereof to provide support for the inner edges (now contiguous edges) of the end members.

At the entrance end of the runways, the portion of the inner guide rail 57 between the grooves 58 is formed as a tapered or wedge shaped tongue 59 (Fig. 1) which serves as a divider member to direct individual end members A into their proper runway. Beyond this tongue 59 the portion of the guide rail below the grooves 58 extends up to the station D to serve as a support 60 for the contiguous end members A in front of the station.

In order to advance into the runways 51, 52 the two side-by-side end members A disposed in front of the cutting station D, the apparatus is provided with a pair of spaced and parallel endless chain conveyors 61, 62 which carry spaced feed dogs 63 for engagement in the filling openings C of the end members A as shown in Figs. 1 and 3. These conveyors 61, 62 are disposed partially in the runways 51, 52 and partially beyond the runways, the portion beyond the runways extending up to the cutting station D to engage and advance the end members A as soon as they are cut from the web B. The conveyors 61, 62 operate over idler sprockets 65, 66 (Figs. 3 and 5) mounted on studs 67 carried in the frame 23, and over a pair of driving sprockets 68 (Figs. 1, 3 and 5) mounted on a cross-shaft 69 journaled in bearings 70 formed in the frame 23. The shaft 69 is driven continuously by a gear 72 which meshes with and is driven by an idler gear 73 mounted on a stud 74 secured in the frame 23. The idler gear 73 is rotated by a gear 75 which is mounted on the main drive shaft 49.

As the feed dogs 63 on the feed chains 61, 62 pick up and propel the contiguous end members A toward the entrance ends of the runways 51, 52 they advance the end members into engagement with a pair of separator elements E (Fig. 1) which are disposed adjacent the outer marginal edges of the end members and which retard the forward movement of the members with the result that the members are pivoted in such a manner as to cause their inner contiguous edges to spread apart in diverging directions and thus separate the members and align them with their respective runways for proper entrance thereinto. For this purpose the grooves in the outer guide rails 22, just beyond the cutting station D, tapers or flares outwardly into the grooves 55 of the guide rail extensions 54 to provide clearance for the pivoting end members and to continue guiding the outer edges of the members during and after their separation.

The separator elements E which effect the pivoting of the end members A preferably are flat leaf springs 77 (Figs. 2 and 6) which are disposed in recesses 78 formed in the upper portion of the guide rails and which permit the springs to extend down into the grooves in the path of travel of the end members. The leading end of each of the springs 77 is secured to the upper portion of the guide rails.

Figure 7:
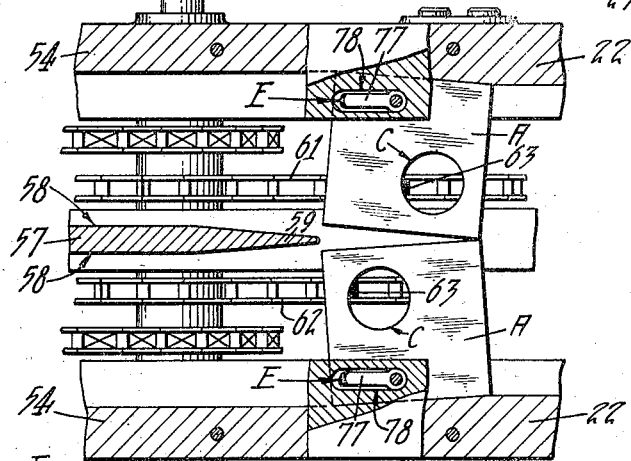

Hence when the feed dogs 63 of the conveyors 61, 62 move the contiguous end members A forward along the guide rails 22 and central support 60, the members A remain in contiguous relation as shown in Fig. 6 until their outer marginal edge portions engage and ride under the leaf springs 77 of the separator elements E. Since the filling openings C in the end members A are located in an offcenter position adjacent the inner contiguous edges of the members, the forward movement of the feed dogs 63, engaged in the openings, tends to advance the inner edges of the members while their outer edges are retarded by frictional engagement with the springs 77. The result of this action is that the end members A are pivoted on the springs 77 as the members continue to move forward as shown in Fig. 7. This pivoting action causes the inner edges of the members to spread apart in diverging directions as shown in Fig. 7 for the reception of the tongue or divider 59 of the central guide rail 57. At the same time this pivoting action causes the outer edges of the end members A to engage and follow the tapered or outwardly flared portion of the grooves in the guide rails 22 to guide the end members into the outer grooves 58 of the guide rail extensions 57 as shown in Fig. 7. In this manner the contiguous end members A are separated and aligned with the entrance ends of the runways 51, 52 for individual reception thereby as the members continue to move forward under the propelling action of the conveyor feed dogs 63.

Figure 5:
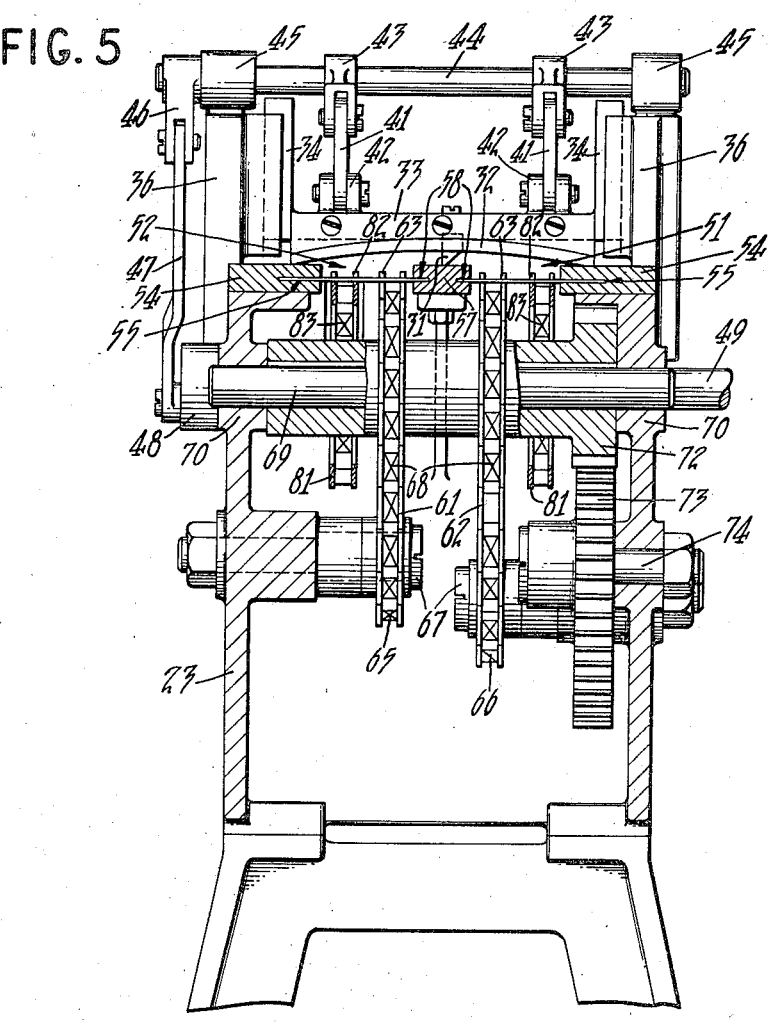
Figure 8:
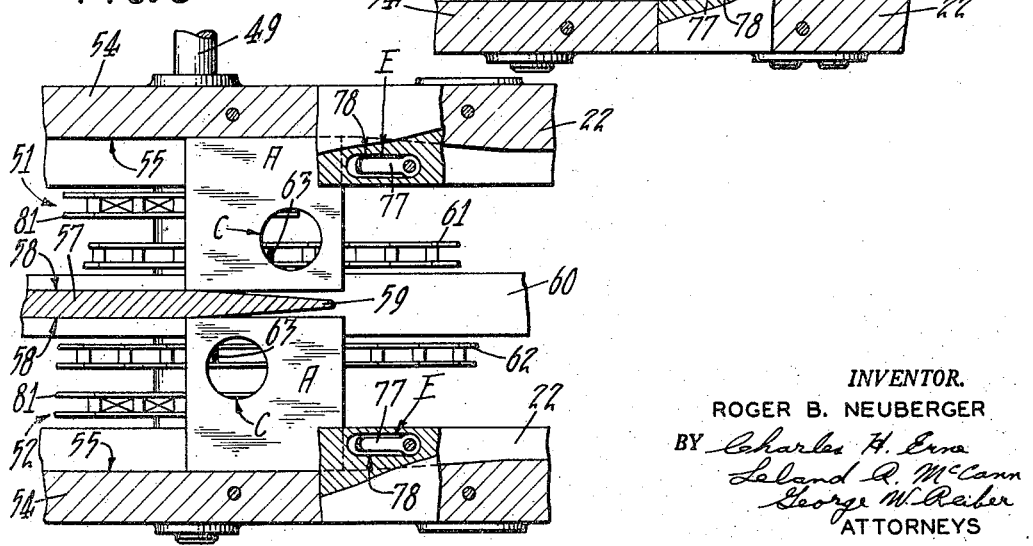

When the end members A pass beyond the separator elements E and are disposed fully within their separate runways 51, 52 as shown in Fig. 8, the conveyor dogs 63 rotate over the drive sprockets 68, out of engagement with the end members at the opening C. Thereafter the members are further propelled along the runways by engagement against their rear edges. For this purpose the apparatus is provided with a pair of advancing conveyors 81 (Figs. 1, 3, 5 and 6) which are disposed in the runways 51, 52. Each conveyor 81 carries spaced feed fingers 82 for engagement behind the end members A (Figs. 1, 3 and 5). The conveyors 81 operate over and are driven by sprockets 83 which are mounted on and rotate with the main shaft 49. The conveyors 81 carry the end members A individually to any suitable place of deposit.

Figure 9:
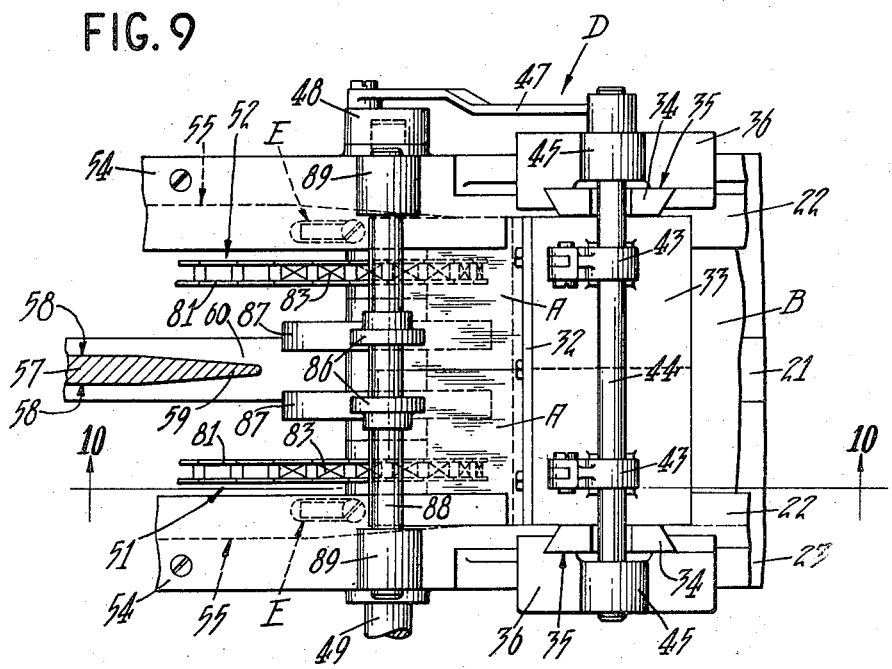
Fig. 9 is a top plan view of a modified form of the apparatus shown in Fig. 1.
Figure 10:
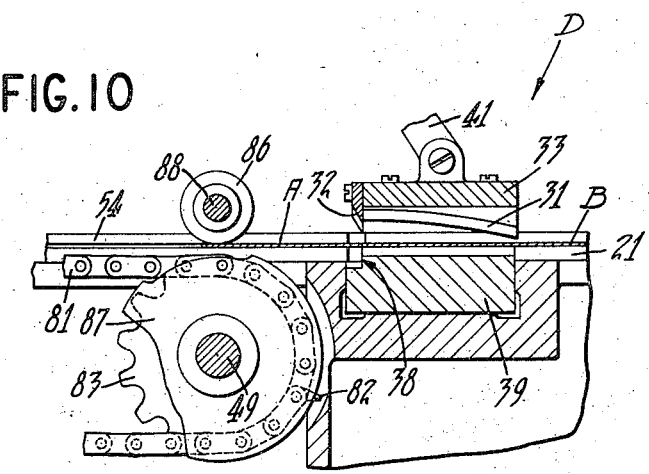
Fig. 10 is a longitudinal section taken substantially along the line 10—10 in Fig. 9.

A modified form of the invention, as shown in Figs. 9 and 10, is provided for propelling the contiguous end members A into frictional engagement with the separator elements E, where no openings C are provided in the members A for the conveyor feed dogs 63. In this modified form of the invention rotating upper and lower feed rollers 86, 87 between which the end members A pass, are substituted for the feed dogs 63. The lower rollers 87 are mounted on and rotate with the main drive shaft 49. The upper rollers 86 are idle rollers and are utilized to press the end members A against the lower roller 87 to provide frictional propelling engagement therewith. These upper pressure rollers 86 are mounted on a cross-shaft 88 carried in bearings 89 which extend up from the guide rails 22. Like the conveyor chains 61, 62 the feed rollers 86, 87 are disposed off center, i. e. adjacent the inner contiguous edges of the end members A to exert a pivoting movement to the end members while their outer edges are frictionally engaged and retarded by the separator elements E. The latter are of the same construction as shown in Fig. 2. The upper and lower feed rollers 86, 87 are positioned immediately in front of the cutting station D to grip and advance the contiguous end members A as soon as they are cut off from the web B at the cutting station as explained in connection with the preferred form of the invention. The lower roller 87 is relieved along a portion of its periphery to delay engagement with the upper roller 86 until the members A are cut free from the web B.

Although the apparatus illustrated in the drawings show only two contiguous articles in a row to be advanced and separated for individual passage into separate runways or other conveying devices, the invention is equally well adapted to feeding and separating more than two articles in a row. Fig. 11 schematically illustrates how three contiguous articles can be separated by friction separtor elements E disposed adjacent the outer edges of the two outside articles. In a similar manner Fig. 12 illustrates schematically how four such articles may be separated, first by frictional engagement of the outer edges of the two outer articles and then by frictional engagement of the outer edges of the two inner articles.

The same result of pivoting the articles into alignment with individual runways may also be accomplished by frictionally engaging the inner edges of the contiguous articles instead of their outer edges and rotating the articles through an angle of 90° to effect separation. Fig. 13 schematically illustrates how this can be done with two contiguous articles and Fig. 14 with three such articles.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a feeding and separating mechanism for rectangular articles transversely arranged in a row and in contiguous side-by-side relation, the combination of a support for said articles, a plurality of spaced runways disposed adjacent said support for the reception of said articles individually, divider means disposed between said runways, means for advancing a pair of said transversely arranged contiguous articles longitudinally along said support toward said runways, and at least one separating member disposed adjacent said support and projecting into the path of travel of a lateral off-center surface of one of said advancing articles substantially parallel to the plane of said support, whereby said separating member frictionally engages and presses against said lateral surface of the advancing article thereby causing the engaged article to turn slightly and divergently separate from the next contiguous article to facilitate the entrance of said divider means between the separated articles to direct the articles to said runways.

2. In a feeding and separating mechanism of the character defined in claim 1 wherein said separating member is a flat leaf spring engageable with said lateral surface of an article in an advancing row to separate the contiguous articles.

3. In a feeding and separating mechanism of the character defined in claim 1 wherein said separating member is disposed above said support and projects downwardly into the path of said article and presses against a said lateral surface of the article remote from the contiguous sides of the articles to cause said separation.

4. In a feeding and separating mechanism for rectangular articles arranged in a row and in contiguous side-by-side relation, the combination of a support for said articles, a plurality of parallel runways disposed adjacent said support for the reception of said articles individually therefrom, guide rails disposed adjacent the path of travel of said articles and leading toward said runways for guiding said articles, means for advancing a transverse row of said contiguous articles along said support and said guide rails toward said runways, and a plurality of separating members disposed in said guide rails adjacent the entrance end of said runways for frictionally contacting off-center surfaces of sides of the advancing articles to retard the contacted sides of said articles and cause each of said contacted articles to separate from its next contiguous article to facilitate entrance of the articles into said runways individually.

5. In a feeding and separating mechanism for rectangular articles arranged in a row and disposed in contiguous side-by-side relation, the combination of a support for said articles, a plurality of laterally spaced and parallel runways disposed adjacent said support for the reception of said articles individually, feeding means for advancing a transverse row of said contiguous articles along said support toward said runways, a plurality of separating members having yieldable portions disposed in the paths of travel of lateral off-center surfaces of said articles whereby said yieldable portions of the separating members frictionally engage and drag against said surfaces of the moving articles thereby causing each article thus engaged to turn slightly and separate from the next contiguous article and thus facilitate entrance of said divider means between the advancing separated articles to direct said articles to said runways.

6. In a feeding and separating mechanism for articles the combination comprising means for advancing a transversely arranged pair of articles disposed in juxtaposed unspaced relationship, a longitudinal center support for supporting the inside juxtaposed portions of the advancing articles, a pair of longitudinal guideways for supporting the outside lateral portions of the advancing articles, said center support and said guideways cooperating to form a common runway for said juxtaposed articles, longitudinal dividing means disposed adjacent said center support for dividing said common runway into a pair of transversely spaced runways, and a pair of article separating members mounted adjacent said longitudinal guideways ahead of said dividing means and disposed in the paths of lateral off-center surfaces of the articles, whereby said separating members press against said lateral surfaces of the articles and slightly restrain the articles from advancement relative to their inside portions and said juxtaposed portions of the advancing articles to separate said articles divergently for reception of said dividing means.

7. In a feeding and separating mechanism for articles the combination comprising means for longitudinally advancing transverse rows of side-by-side and unspaced articles along a predetermined primary path, a plurality of yieldable article separating members disposed above and into said path of the articles, said members yieldably engaging and dragging against lateral off-center surfaces of said advancing articles for yieldably restraining forward advancement of the articles on the sides thus engaged, whereby each of said articles is turned and diverted angularly from its said predetermined path into a secondary path, means for guiding each of said articles along its secondary path, and means for conveying each of said diverted articles along its secondary path.

References Cited in the file of this patent

UNITED STATES PATENTS

| | | |
|---|---|---|
| 2,044,902 | Ferenci | June 23, 1936 |
| 2,134,310 | McGrath | Oct. 25, 1938 |
| 2,243,557 | Finster | May 27, 1941 |
| 2,535,880 | Tomkins | Dec. 26, 1950 |
| 2,769,558 | Ehlers | Nov. 6, 1956 |